(12) United States Patent
Gieshoff et al.

(10) Patent No.: US 6,686,075 B2
(45) Date of Patent: Feb. 3, 2004

(54) PROCESS FOR PRODUCING ELECTRICAL ENERGY WITH THE AID OF A FUEL CELL

(75) Inventors: Jürgen Gieshoff, Biebergemünd (DE); Helga Vollmer, Hanau (DE); Barbara Diehl, Flörsheim (DE); Egbert Lox, Hanau (DE); Thomas Kreuzer, Karben (DE)

(73) Assignee: dmc2 Degussa Metals Catalysts Cerdec AG, Frankfurt am Main (DE)

( * ) Notice: Subject to any disclaimer, the term of this patent is extended or adjusted under 35 U.S.C. 154(b) by 293 days.

(21) Appl. No.: 09/859,680

(22) Filed: May 18, 2001

(65) Prior Publication Data

US 2002/0025456 A1 Feb. 28, 2002

(30) Foreign Application Priority Data

May 20, 2000 (DE) .......................................... 100 25 033

(51) Int. Cl.$^7$ ................................................. H01M 8/16
(52) U.S. Cl. ............................... 429/2; 429/12; 429/13; 429/17; 429/19; 429/30; 429/33; 429/34
(58) Field of Search ................................. 429/2, 13, 17, 429/12, 19, 30, 33, 34

(56) References Cited

U.S. PATENT DOCUMENTS

| | | | | | |
|---|---|---|---|---|---|
| 4,294,891 | A | * | 10/1981 | Yao et al. | 429/2 |
| 5,645,951 | A | * | 7/1997 | Johnssen | 429/16 |
| 5,976,719 | A | * | 11/1999 | Kim et al. | 429/2 |
| 6,294,281 | B1 | * | 9/2001 | Heller | 429/43 |
| 6,500,571 | B2 | * | 12/2002 | Liberatore et al. | 429/2 |
| 6,531,239 | B2 | * | 3/2003 | Heller | 429/43 |

* cited by examiner

Primary Examiner—Bruce F. Bell
(74) Attorney, Agent, or Firm—Kalow & Springut LLP

(57) ABSTRACT

A process for producing electrical energy with the aid of a fuel cell, which includes the steps of reforming an organic fuel, removing carbon monoxide from the reformate, and reacting the hydrogen present in the reformate with oxygen, in a fuel cell, to thereby produce electrical energy. The carbon monoxide is removed from the reformate by treating the reformate in a bioreactor which contains a thermophilic microorganism strain which metabolizes carbon monoxide, under anaerobic conditions, to give carbon dioxide and hydrogen.

14 Claims, 2 Drawing Sheets

PROCESS FOR PRODUCING ELECTRICAL ENERGY WITH THE AID OF A FUEL CELL

BACKGROUND OF THE INVENTION

1. Field of the Invention

The invention provides a process for electrical energy production with the aid of a fuel cell.

2. Description of the Related Art

Fuel cells as energy converters have been studied very intensively in the recent past both for mobile and for stationary applications. Fuel cells enable the electrochemical conversion of fuel gases and oxygen into oxidized products and electrical energy. The difference from traditional chemical processes consists of performing reduction and oxidation of the components, separately, at two electrodes. Chemical reaction of the reactants at the electrodes occurs because ionic conduction is ensured via a gas-tight electrolyte, and the transport of electrons takes place only via an external circuit.

Hitherto, substantially hydrogen and, with a much lower efficiency, methanol, have been studied as fuels. Oxygen and air have been considered as oxidizing agents. The less favorable efficiency of the direct methanol fuel cell is due to the intermediates of methanol oxidation being very strongly adsorbed at the anode. A similar effect can be observed in the case of a hydrogen fuel cell when the fuel gas is contaminated with carbon monoxide. The drop in efficiency due to the presence of carbon monoxide is then a function of the carbon monoxide concentration and the operating temperature.

The purity of the hydrogen, and in particular the presence of carbon monoxide, thus has a large effect on the electrical efficiency. Ultra-pure hydrogen can be obtained directly from water and electrical energy. This production process, however, is sensible only in certain cases, for example solar energy, and is therefore used in that context. For industrial applications of fuel cells, the hydrogen is obtained from fossil fuels. Typical representatives of these fuels are natural gas, methanol and aliphatic or aromatic hydrocarbons, as well as mixtures thereof, such as, for example, petrol and diesel oil. In principle, it is also possible to produce the hydrogen-containing fuel gas biologically and directly as synthesis gas and to work it up in an appropriate manner for use in a fuel cell. Methanol can also be produced biologically, for example, with the aid of methylotrophic yeasts.

These energy carriers can be converted, for example by steam reforming, into a gas mixture consisting of residual fuel, carbon dioxide, carbon monoxide, and hydrogen. Downstream of the reformer, the gas contains about 5 vol. % carbon monoxide, in the case of reforming methane. This concentration is unsuitable both for the currently used low-temperature fuel cells based on a polymer electrolyte membrane (PEMFC=Polymer Electrolyte Membrane Fuel Cell), and for the phosphoric acid fuel cell (PAFC= Phosphoric Acid Fuel Cell).

The first purification route is associated with a high energy demand, due to PSA, and also requires extensive equipment. CO hydrogenation then leads to a gas with very low residual concentrations of carbon monoxide. As a result of the hydrogenation reaction, however, the amount of hydrogen produced is decreased.

For a PAFC which operates as a stationary system at about 200° C., a concentration of up to about 1 vol. % carbon monoxide can be tolerated in the fuel gas. In order to maintain this value, carbon monoxide contained in the reformate can be reacted with water to give carbon dioxide and hydrogen, in the presence of suitable catalysts, in accordance with the following chemical equation:

$$CO + H_2O \leftrightarrows H_2 + CO_2 \quad \Delta H > 0 \tag{1}$$

The reaction in accordance with chemical equation (1) is called carbon monoxide conversion, or CO conversion, in the following. In English, the expression "water gas shift reaction" is often used to describe this process.

Carbon monoxide conversion is normally performed in a two-step process. In the first process step, so-called high temperature CO conversion (high temperature water gas shift, HTS) is performed at temperatures between 360 and 450° C. on Fe/Cr catalysts. In the subsequent, second step, low temperature CO conversion (low temperature water gas shift, LTS) is performed at temperatures between 200 and 270° C. on Cu/ZnO catalysts. Following the low temperature process step, in accordance with the thermal equilibrium, concentrations of less than 1 vol. % carbon monoxide are present in the fuel gas.

The membrane fuel cell (PEMFC), a system with an operating temperature of about 80° C., is much more demanding with regard to CO concentration. Here, only values in the ppm range can be tolerated because carbon monoxide enters into very strong adsorptive interactions with the platinum particles on the electrode surface. Gas purification takes place, for example, in stationary units via pressure swing adsorption (PSA) of the carbon dioxide, and subsequent hydrogenation of the carbon monoxide to give methane, or by selective oxidation of the carbon monoxide to give carbon dioxide.

The first purification route is associated with a high energy demand, due to PSA, and also requires extensive equipment outlay. CO hydrogenation then leads to a gas with very low residual concentrations of carbon monoxide. As a result of the hydrogenation reaction, however, the amount of hydrogen produced is decreased.

Direct selective oxidation of carbon monoxide is currently the route which is followed, particularly in mobile applications. Here, a small amount of air is deliberately metered into the fuel gas stream. The atmospheric oxygen reacts with the carbon monoxide to give carbon dioxide. In this process arrangement, however, some of the useful gas hydrogen is also oxidized, so here again a drop in efficiency is observed.

Another process for removing carbon monoxide is the membrane technique with, for example, Pd/Ag membranes. The currently used membranes, however, are relatively expensive (limited palladium deposits), and require a high energy input in order to produce the pressure drop required. In addition, there are still some unsolved mechanical problems, and these can lead to low long-term stability.

Carbon monoxide conversion in accordance with chemical equation (1) is also used by certain microorganisms for the production of energy. See, for example, V. A. Svetlichny et al., "Carboxidothermus hydrogenoformans gen. nov., sp. nov., a CO-utilizing thermophilic anaerobic bacterium from hydrothermal environments of Kunashir Island", System. Appl. Microbiol. 14, 254–260 (1991), and M. Gerhardt et al., "Bacterial CO utilization with $H_2$ production by the strictly anaerobic lithoautotrophic thermophilic bacterium Carboxydothermus hydrogenus DSM 6008 isolated from hot swamp", FEMS Microbiology Letters 83 (1991) 267–272. According to DD 297 449 A5, this organism can be used to remove carbon monoxide from synthesis gas. DD 297 450 A5 describes a process for the microbial production of hydrogen and/or methane using this microorganism. Carboxidothermus hydrogenoformans is deposited at the German Collection of Microorganisms and Cell Cultures GmbH under number DSM 6008. The preceding references are incorporated by reference herein in their entirety.

The use of extremely thermophilic bacteria recently isolated from hot springs is particularly suitable for the process according to the invention. The strictly anaerobic bacteria from the strain Carboxidothermus hydrogenoformans DSM 6008 have been discovered only recently. They are capable of growing in aqueous media under an atmosphere of pure carbon monoxide. They form, in accordance with equation (1) and in addition to their cell substance, hydrogen and carbon dioxide as the only metabolic products, in equimolar amounts. The optimum conditions for the growth of these microorganisms are present at a temperature between 35 and 90° C., at a pH between 5.0 and 8.0, and at a pressure from 1 to 10 bar. The enzyme CO-dehydrogenase is responsible for catalyzing the carbon monoxide conversion by Carboxidothermus hydrogenoformans.

The object of the present invention is to provide a process for electrical energy production with the aid of a fuel cell, in which the hydrogen required is obtained by reforming an organic fuel, and in which the carbon monoxide present in the reformate is converted to carbon dioxide and hydrogen by an energetically efficient process.

SUMMARY OF THE INVENTION

The object of the invention is achieved by a process for electrical energy production with the aid of a fuel cell, by reforming an organic fuel, removing carbon monoxide from the reformate, and reacting the hydrogen present in the reformate with oxygen, in a fuel cell, to thereby produce electrical energy. To remove the carbon monoxide from the reformate, the reformate is treated in a bioreactor which contains an enzyme or a thermophilic microorganism strain which metabolizes carbon monoxide under anaerobic conditions to give carbon dioxide and hydrogen.

BRIEF DESCRIPTION OF THE DRAWINGS

The invention will be better understood with reference to the accompanying drawings, in which.

DETAILED DESCRIPTION OF THE INVENTION

Figure 1:
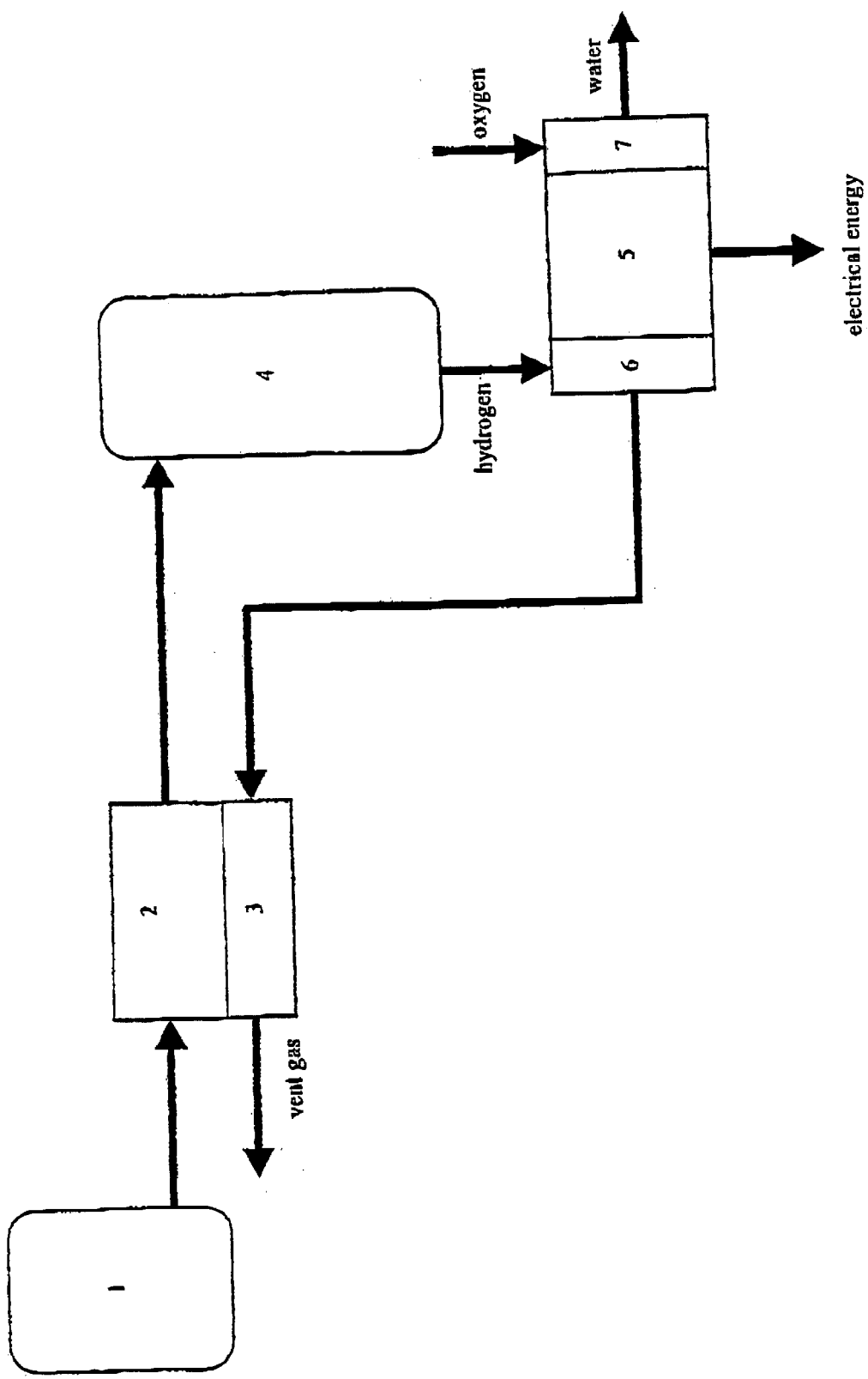
FIG. 1 depicts a process scheme for the production of electrical energy with a PEM fuel cell, using biological purification of the reformate gas.

The use of extremely thermophilic bacteria recently isolated from hot sources is particularly suitable for the process according to the invention. The strictly anaerobic bacteria from the strain Carboxidothermus hydrogenoformans DSM 6008 have been discovered only recently. They are capable of growing in aqueous media under an atmosphere of pure carbon monoxide. They form, in accordance with equation (1) and in addition to their cell substance, hydrogen and carbon dioxide as the only metabolic products, in equimolar amounts. The optimum conditions for the growth of these microorganisms are present at a temperature between 35 and 90° C., at a pH between 5.0 and 8.0, and at a pressure from 1 to 10 bar. The enzyme CO-dehydrogenase is responsible for catalyzing the carbon monoxide conversion by Carboxidothermus hydrogenoformans.

Carboxidothermus hydrogenoformans is an obligatory CO-degrader; that is, no growth occurs without carbon monoxide. Even under atmospheres of $N_2+CO_2$, $H_2+CO_2$, and $CO+O_2$, no growth can be detected. The rate of growth or the rate of CO degradation can be increased by adding yeast extract, peptone, amino acids, or peptide mixtures. In comparison with other anaerobic CO-degrading organisms, Carboxidothermus hydrogenoformans metabolizes carbon monoxide relatively rapidly. Specific rates of CO degradation of 100 $\mu$mol CO/mg biomass×min. or 7.4 $\mu$mol CO/(ml culture solution×h) are mentioned. Cell concentrations of $5 \times 10^7$ to $5 \times 10^8$ cells/ml were achieved (Svetlichny et al. and DD 297 450 A5).

In a preferred embodiment of the invention, the bioreactor is integrated in the fuel cell stack of a PEM fuel cell unit. This can be achieved in such a way that either the microorganism as a whole, or the isolated enzyme CO-dehydrogenase, is fixed directly to the gas distributor structure of the anode.

These boundary conditions apply to the fuel gas composition downstream of a reformer, because no oxygen is present on the fuel gas side. At the same time, these microorganisms are extremely thermophilic, so reactions at temperatures up to 90° C. are possible. The preferred growth conditions are temperatures of 70 to 72° C., and a pH of 6.8 to 7.0.

There are many other microorganisms which are able to degrade CO via various metabolic routes (not necessarily anaerobic and thermophilic). However, these microorganisms are generally not able to perform the classical water gas shift reaction ($CO+H_2O \rightarrow CO_2+H_2$), but form some unwanted secondary products, such as, for example, methane. In the case of the application considered here, electrical energy production in a fuel cell, the gas downstream of the reformer contains no oxygen, so only strictly anaerobic and thermophilic organisms lead to the ultimate objective.

The bioreactor for removing carbon monoxide from the reformate can be used either in combination with a polymer electrolyte fuel cell, or in combination with a phosphoric acid fuel cell. The size of the bioreactor required is governed by whether the reformate is intended to be biologically purified directly, or whether the bioreactor is used only for final purification downstream of a non-biological process step for carbon monoxide conversion. This non-biological process step may consist of both a high temperature and a low temperature step for carbon monoxide conversion. It is also possible to decouple the rates of reaction in the various process steps by temporary storage of the gas in a gas tank before or after biological purification.

The bioreactor may be, for example, a stirred tank reactor. Preferably, however, the microorganism is fixed to support materials and used in trickle film reactors or biofilters. To improve the growth conditions, the microorganism may be cultivated on yeast extract, peptone, or on a substrate containing other proteins. As an alternative, only the enzyme CO-dehydrogenase, instead of the entire microorganism, may be fixed to a support material, after it has been isolated.

In a preferred embodiment of the invention, the bioreactor is integrated in the fuel cell stack of a PEM fuel cell unit. This can be achieved in such a way that either the microorganism as a whole, or the isolated enzyme CO-dehydrogenase, is fixed directly to the gas distributor structure for the anode.

FIG. 1 shows a process scheme for electrical energy production with a polymer electrolyte membrane fuel cell (PEM fuel cell). As the hydrogen supplier, hydrocarbons are used which are taken from a tank (1) and treated in a steam reformer (2) to produce a reformate containing hydrogen and carbon monoxide. On leaving the steam reformer, the reformate contains about 5 vol. % carbon monoxide, in accordance with the thermal equilibrium at the discharge temperature. To remove the carbon monoxide, the reformate gas is treated in a bioreactor (4). The purified reformate gas is then reacted in a known manner in the fuel cell (5) to produce electrical energy. For this purpose, the hydrogen from the bioreactor is supplied to the anode (6) of the fuel cell, whereas the cathode (7) of the fuel cell is supplied with oxygen (for example from air). Hydrogen which is not consumed in the fuel cell is catalytically burnt (3) in order to heat the steam reformer before the vent gas is released to the environment.

The following calculations serve to estimate the required size of the bioreactor in this case. It is assumed that natural gas is used as the energy carrier. Analogous calculations also apply to other fuel gases such as, e.g., methanol.

The fuel cell has an electrical power of 10 kW, and an electrical efficiency of 50%. Thus, the hydrogen inflow required is calculated as 6270 1/h (=20 kW lower heating value).

Hydrogen production from natural gas (using methane as the basis for calculation) is described by the overall chemical equation:

$$CH_4 + 2H_2O \rightarrow 4H_2 + CO_2 \quad (2)$$

In order to suppress the deposition of carbon in the reformer, the water content is increased to a molar ratio of water to methane=3:1.

Thus hydrogen, carbon dioxide and water are found in the product gas mixture in the molar ratio of 4:1:1. The reformate gas leaving the steam reformer also contains about 5 vol. % carbon monoxide. This amount corresponds to a volume flow of 500 l/h, that is, 22.3 mol/h CO. This volume flow has to be reduced to about 10 to 100 ppm. Thus, the size of the bioreactor obtained from this calculation, taking into account the known metabolic data for Carboxidothermus hydrogenoformans (specific rate of CO degradation: 7.4 $\mu$mol CO/(ml culture solution×h) is a volume of culture solution of 3 m³.

Figure 2:
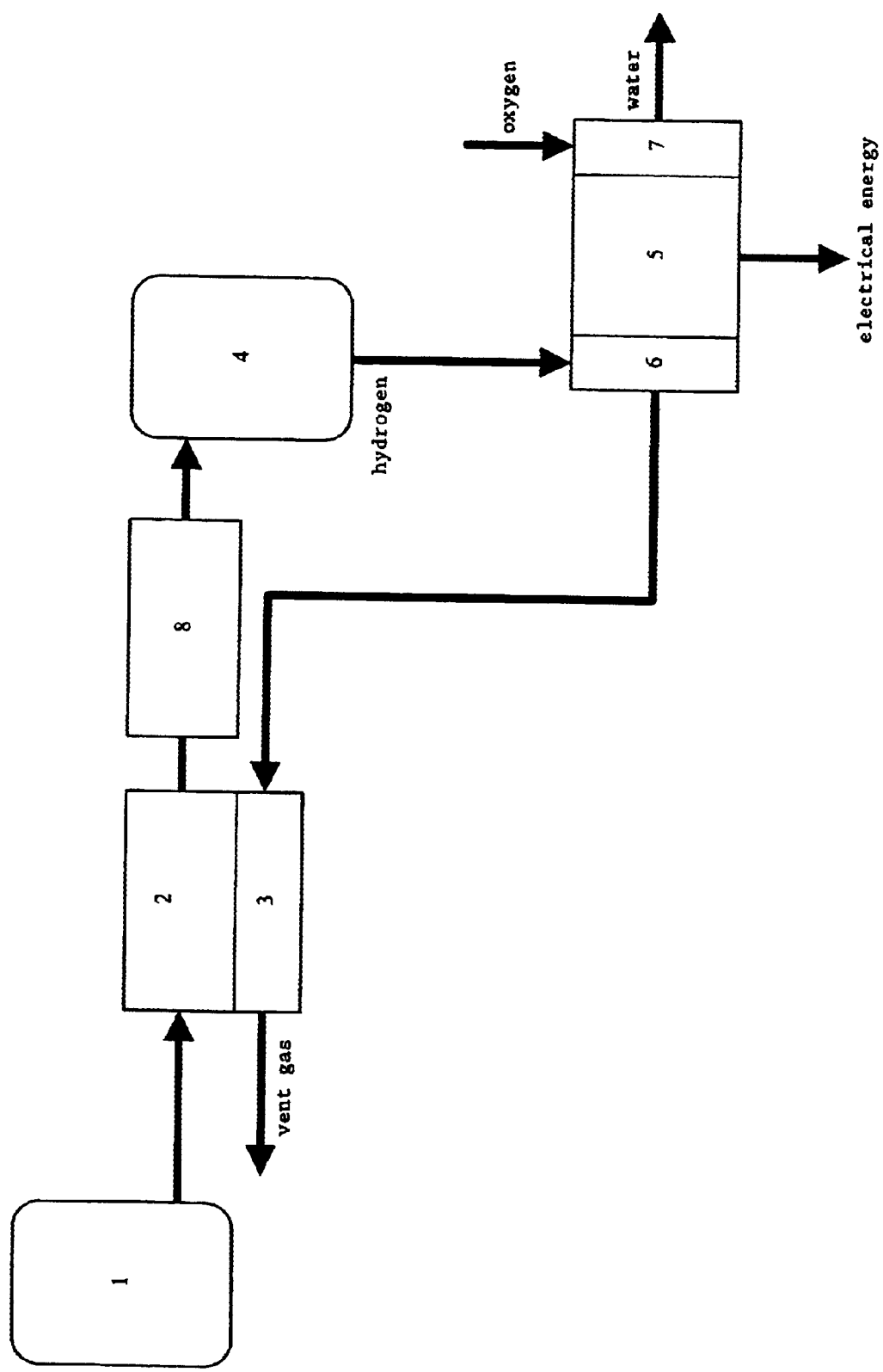
FIG. 2 depicts a process scheme for the production of electrical energy with a PEM fuel cell, with a combined non-biological and biological purification step for the reformate gas.

FIG. 2 shows an alternative process scheme for electrical energy production with a polymer electrolyte membrane fuel cell. In FIG. 2, to remove the carbon monoxide, the reformate gas is first passed through a conventional process step for carbon monoxide conversion (8). The reformate gas leaving this process step now contains only about 0.5 vol. % carbon monoxide, that is, only about one tenth the amount of that in accordance with FIG. 1. Accordingly, the bioreactor (4) for final biological purification can be reduced to 300 l of culture solution.

le;2qThese estimates show that the proposed process can be used, in particular, for stationary energy production with the aid of fuel cells. The advantages are, on the one hand, the avoidance of hydrogen losses in the final purification stage which is required and, on the other hand, given appropriate insulation of the reaction container, also the reduction in the total energy demand.

Further variations and modifications will be apparent to those skilled in the art from the foregoing, and are intended to be encompassed by the claims which follow.

German priority application 100 25 033.5 is relied on and incorporated herein by reference.

We claim:

1. A process for producing electrical energy using a fuel cell, the process comprising:
    reforming an organic fuel to produce a reformate;
    removing carbon monoxide from the reformate by treating the reformate in a bioreactor which contains CO-dehydrogenase or a thermophilic microorganism strain which metabolizes carbon monoxide under anaerobic conditions to give carbon dioxide and hydrogen; and
    reacting the hydrogen from the reformate with oxygen in a fuel cell to produce electrical energy.

2. The process according to claim 1, wherein the thermophilic microorganism strain comprises Carboxidothermus hydrogenoformans DSM 6008, and wherein the treating of the reformate is carried out at a temperature between 35 and 90° C., at a pH between 5.0 and 8.0, and at a pressure between 1 and 10 bar.

3. The process according to claim 1, wherein the fuel cell is selected from the group consisting of a polymer electrolyte fuel cell and a phosphoric acid fuel cell.

4. The process according to claim 1, wherein the reformate is pre-treated in a preliminary, non-biological carbon monoxide conversion step before being treated in the bioreactor.

5. The process according to claim 4, wherein the preliminary pre-treatment step comprises a high temperature step and a low temperature step for carbon monoxide conversion.

6. The process according to claim 4, wherein the process is carried out using at least one gas storage tank before or after the step of treating the reformate in a bioreactor so that the reformate before the treating step, or the oxygen and hydrogen after the treating step, is stored in the at least one gas storage tank for a period of time.

7. The process according to claim 1, wherein the microorganism strain is cultivated on at least one member selected from the group consisting of yeast extract, peptone, and a substrate containing other proteins.

8. The process according to claim 1, wherein the microorganism strain or the CO-dehydrogenase enzyme is fixed in the reactor to support materials.

9. A polymer electrolyte fuel cell, comprising:
    a polymer electrolyte membrane, which is coated on a first face with an anode catalyst, and on a second face with a cathode catalyst, wherein the anode catalyst and the cathode catalyst are each covered with a gas distributor structure for electrical contact and for supplying and removing reaction media; and
    microorganisms, immobilized as whole cells on the gas distributor structure for the anode.

10. A polymer electrolyte fuel cell, comprising:
    a polymer electrolyte membrane, which is coated on a first face with an anode catalyst, and on a second face with a cathode catalyst, wherein the anode catalyst and the cathode catalyst are each covered with a gas distributor structure for electrical contact and for supplying and removing reaction media; and
    CO-dehydrogenase enzyme, immobilized on the gas distributor structure for the anode.

11. A process for removing carbon monoxide from a reformate of an organic fuel, the process comprising treating the reformate in a bioreactor which contains at least one member selected from the group consisting of CO-dehydrogenase and a thermophilic microorganism strain which metabolizes carbon monoxide under anaerobic conditions to give carbon dioxide and hydrogen.

12. A process for producing hydrogen and carbon dioxide from the reformate of an organic fuel, the process comprising removing carbon monoxide from the reformate by treating the reformate in a bioreactor which contains at least one member selected from the group consisting of CO-dehydrogenase and a thermophilic microorganism strain which metabolizes carbon monoxide under anaerobic conditions to give carbon dioxide and hydrogen.

13. A process for producing electrical energy using a fuel cell, the process comprising:

reforming an organic fuel to produce a reformate;

contacting the reformate with CO-dehydrogenase or a thermophilic microorganism strain which metabolizes carbon monoxide under anaerobic conditions to give carbon dioxide and hydrogen; and reacting the hydrogen from the reformate with oxygen in a fuel cell to produce electrical energy.

14. The process according to claim 13, wherein the thermophilic microorganism strain comprises Carboxidothermus hydrogenoformans DSM 6008, and wherein the contacting of the reformate is carried out at a temperature between 35 and 90° C., at a pH between 5.0 and 8.0, and at a pressure between 1 and 10 bar.

* * * * *